Nov. 9, 1971   M. J. FROST   3,618,229
DEVICE FOR TEACHING GEOGRAPHY, TIMES AND DATES
Filed June 30, 1969   2 Sheets-Sheet 1
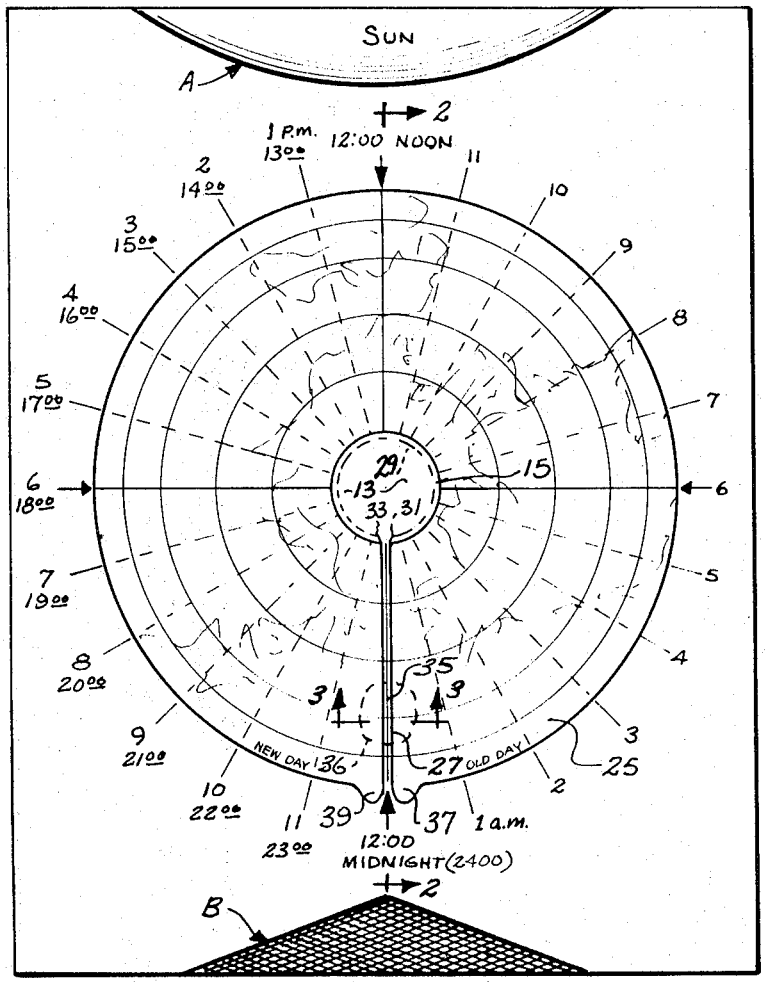
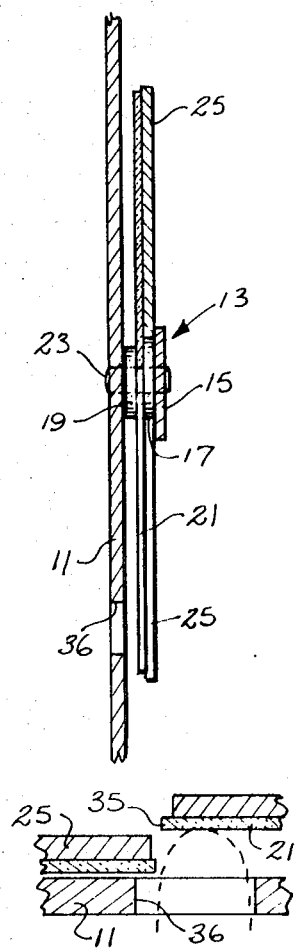
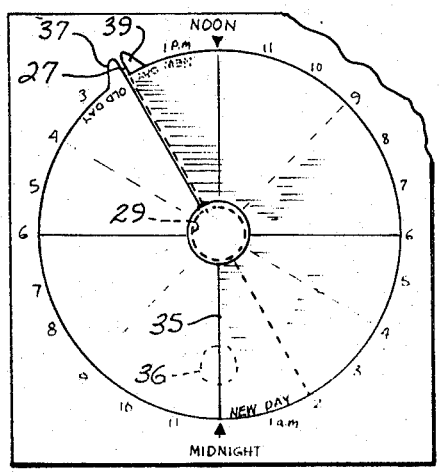
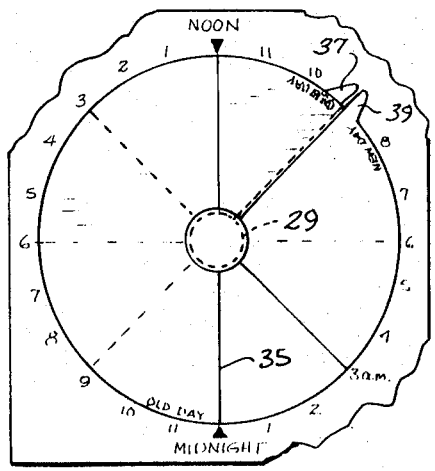
INVENTOR
MELVIN JESSE FROST
BY
Edwin M. Thomas ATTORNEY Nov. 9, 1971  M. J. FROST  3,618,229
DEVICE FOR TEACHING GEOGRAPHY, TIMES AND DATES
Filed June 30, 1969  2 Sheets-Sheet 2

INVENTOR
MELVIN JESSE FROST
BY
ATTORNEY

United States Patent Office 3,618,229
Patented Nov. 9, 1971

3,618,229
DEVICE FOR TEACHING GEOGRAPHY, TIMES AND DATES
Melvin J. Frost, 253 N. Fraser Drive, Mesa, Ariz. 85201
Filed June 30, 1969, Ser. No. 837,554
Int. Cl. G09b 29/00
U.S. Cl. 35—44
8 Claims

ABSTRACT OF THE DISCLOSURE

A base member of plane or spherical surface and bearing time indicia has axed thereto but spaced therefrom a sheet or hollow spherical element of translucent flexible material slitted so that a rotatable cartographic member of similar form can be moved continuously in one rotational direction outside of or interleaved between the transparent member and the base member. A hub element for the flexible transparent member which is anchored to the base member provides circumferential tracks for the rotatable cartographic member both outside and inside the transparent member so that the cartographic member can be rotated selectively in the inner or outer position with respect to the transparent member, the transparent member being flexible and slotted but not rotatable.

BACKGROUND AND PRIOR ART

Several attempts have been made in the prior art to produce simple indicators or teaching devices for helping students to understand the relationship between the earth and the sun, and the progress of time around different parts of the world. U.S. Pat. No. 3,412,494, for example, describes a time guide which consists of a marked backing sheet and a rotatable disc fastened thereto. Rotation of the disc is limited to 360° so it is not possible to represent continuous advance of time greater than 24 hours by movement of the disc. To show a second day, this device must be reversed to initial position and a new start made, which is contrary to actual motion of the earth with respect to space and with respect to the sum of our solar system.

In a U.S. Pat. No. 2,525,895 a device is disclosed which shows a major part of the earth's surface in polar projection on a fixed transparent map disc. Movable time discs which can be seen through the map disc are provided to give an idea of time sequence. This patented device has several useful features, such as using time zone markings on a world disc and the depiction of old and new days on slotted helical discs that can be substituted in a sense for each other. However, as in the case of the first patent mentioned, the movable world disc cannot be roated continuously or unidirectionally to show how one day succeeds another. After a single rotation it must be returned to a starting position. This tends to obscure the real sequence of time on the surface of the earth.

Another device of some interest is disclosed in U.S. Pat. No. 2,418,756 which has a movable helical indicator mounted on a polar projection map base to show progress of time as the world rotates. This device also has some tioned, it cannot show the progress of time in continuous unidirectional fashion beyond a single day.

Other devices of the prior art use some of the features disclosed in the patents mentioned in various combinations. The use of continuously rotatable indicators for various other purposes than those mentioned is, of course, well known and. per se, has no velocity. However, in showing the continuous progress of time in a consistent and single direction as the earth rotates, and also showing clearly and in natural fashion the succession of days so that one day is graphically distinct from another but in proper sequence, none of the devices of the prior art is adequate, so far as the present inventor is aware. None of the prior art devices shows or represents in simple but clearly comprehensible fashion the actual progression of time in our system, or the midnight concept of date change, etc., with essential fixed and movable parts arranged for continuous time progress in a single direction. To accomplish such is an object of the present invention.

As indicated above, the use of a polar projection map, by means of which a large part of the earth's surface may be represented on a plane surface arranged around a center corresponding to the North (or South) Pole, is known. A particular object of the present invention, however, is to combine such a polar projection, in movable form, with means for showing successive hours and days, the days being shown with alternating changes in aspect which show at a glance the distinction between a new day and an old or expiring day.

A further specific object is to devise a time and date indicator which is natural and which resembles actual spatial rotation of the earth in its motions and wherein midnight, the demarcation line between successive dates, is emphasized and shown graphically and clearly.

A still further object is to mount a single rotating disc or cartograph member for alternate showing and hiding in front of and behind a substantially translucent or transparent but tinted member of similar form and extent, in such a manner that the dawning new day and the waning old day, as well as proper clock times in both days, are automatically and continuously depicted.

A further and subsidiary object is to mount a slotted rotatable data-bearing or cartographic member on a fixed hub, bearing a slotted or slitted but fixed flexible transparent member in such a manner that the rotatable member can be shifted at will to outside or inside track grooves about the hub to respectively cover or be covered by the transparent member. In a simpler and usually preferred modification, the rotatable and fixed members are substantially plane discs mounted by a hub structure on a planar support but both they and the support members in another modification, may be of spherical surface so as to represent substantially the natural shape of the world.

SUMMARY

A movable data bearing or cartographic member, carrying either a suitable projection or being of globular form, is mounted on a double channeled hub which bears a fixed transparent or tinted translucent flexible complementary member of similar shape and extent, the parts being arranged so that the movable member can be shifted through the fixed complementary member from one side of it to the other, i.e. from one track or channel in the hub to another. In this way, successive days may be depicted by continuous unidirectional rotation of the cartographic member, alternating its position on the hub from one channel to the other, to have the cartographic member pass alternately outside of the fixed complementary member to represent one new day and to progressively eclipse the preceding day, then shift under or behind the complementary member to have the latter progressively show another new day and eclipse or consume the now waning day that was first shown. The rotating cartographic member and the complementary transparent or translucent member may be plane discs or may be spherical elements, i.e. hemispherical or greater, and a fixed support member is preferably of similar shape but of greater area to provide reference marks and indicator data outside the area of the cartographic and translucent members.

BRIEF DESCRIPTION OF DRAWINGS

FIG. 1 is a plan view of a simple disc-type teaching device of the present invention.

FIG. 2 is a sectional view taken substantially along line 2—2 of FIG. 1 and FIG. 3 is an enlarged section on line 3—3 of FIG. 1, showing relative displacement of certain parts out of their normal locations.

FIGS. 4 and 5 are plan views on smaller scale showing different positions of the device of FIGS. 1 and 2.

DESCRIPTION OF PREFERRED EMBODIMENT

Figure 6:
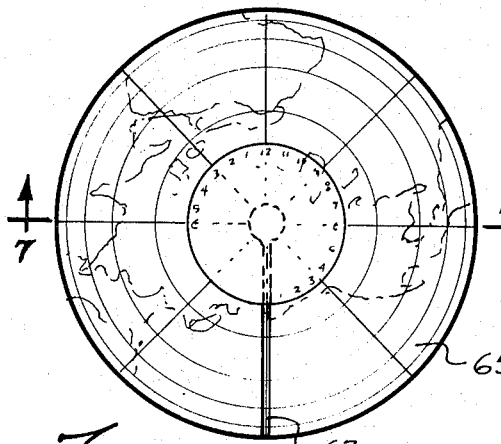
FIG. 6 is a top view of a globular type device, a modification of that of FIGS. 1 to 5.

FIG. 1 shows a simple and relatively inexpensive teaching device, according to the invention, comprising a flat base member 11 made of appropriate stiff material such as a plate of aluminum or other light metal, a heavy cardboard, thin plywood, composition board, stiff plastic sheet or the like. A hub member shown generally at 13 comprises a cap 15, FIG. 2, a spacer 17, and a second spacer 19, with a transparent or substantially transparent or translucent and preferably lightly tinted disc 21 firmly and non-rotatably fastened to the hub by being cemented, riveted or otherwise fixed against rotation between the spacers just mentioned. The hub is fixed securely to the base 11 and provides bearings for supporting a disc 25 for rotation. If desired, a pin or rivet 23 may be used to hold all the parts together but bonding merely by adhesive between parts 15, 17, 21, 19, and 11 will suffice in many cases. The disc 21 is made preferably of a flexible sheet of plastic material such as a vinyl, or equivalent synthetic resin. The parts just described are not assembled, however, until a slotted and somewhat flexible opaque cartographic or other data-bearing disc 25, having an opening 29 large enough to permit rotation on either of the spacers 17, 19, is mounted on one of them. Not only is disc 25 slotted radially at 27 from its outer periphery to the hole 29 which fits around spacer 17 or 19, as shown, but the juncture between the slot and the hole 29 is widened and rounded on both sides, as at 31 and 33. This facilitates shifting of the disc 25 from one spacer or bearing surface to the other when the disc is passed through the slot in disc 21, as will be explained further. The disc opening 29 thus rides either in one channel or the other or is in transition from one to the other, i.e. in the channel between members 15 and 21, around spacer 17, or in the channel between members 21 and 11, around spacer 19. The spacers in this case, each serve as an axle for rotating of the cartographic disc 25. See especially FIG. 2. However, the hole 29 is large enough to allow free rotation and shifting of the disc 25.

The transparent disc 21 which, in a sense to be explained further below, is complementary by reason of its light tint or shading to the cartographic disc 25 is slotted radially at 35 from its periphery to the spacers 17 or 19. This disc preferably is sufficiently flexible, as is also the cartographic disc 25, that by raising a part or element of disc 25 on one side of slot 27, and/or depressing a tab 37 or other element on disc 25, or the other side of slot 27, while rotating the latter disc counter-clockwise, the disc 25 which may be said to be "normally" above the transparent disc 21 may be passed progressively below and under disc 21. A hole 36 in backing member 11, as is shown in FIG. 3, gives access to elements other than tabs 37, 39, and permits insertion of a finger or pencil to raise one edge of each disc for interleaving. This arrangement is supplementary to the tabs 37, 39 and may be convenient in some cases.

Referring to FIG. 4, the tab 37 on one side of slot 27 in disc 25 has been depressed and passed through slot 35 in member 21 whereas the other tab 39 on the opposite side of slot 27 has not. In this way, rotating disc 25 counter-clockwise, the radial edge of disc 25 along slot 27 has been passed through slit 35 and moved some 210° of arc counter-clockwise under the non-rotatable transparent or complementary disc 21; thus disc 25 has been rotated to the 2:00 p.m. or 14:00 hr. position. Beginning at midnight, the chart in FIG. 4 shows that 14 hrs. of the new day are extant on part of the earth west of the international date line while 10 hours of the old and waning day are left on the other part. Looking at the map, which is not shown in fine detail but would be an accurate polar projection in practice, the time and date for any point shown on the map are perfectly determined. That part of the earth which has passed midnight is in the new and growing day and the remainder is in the old or waning day. The hours are indicated in detail on the base or backing member 11, FIG. 1, they are shown in less detail in FIG. 4 so as not to be confusing. Thus the disc 21 which has a slightly contrasting appearance although essentially transparent complements disc 25 in showing a full 24 hours but each disc 21 or 25 shows distinctly its part of a day in a different shade or aspect. That is to say, a whole 24 hours is always showing but normally a part of it will be indicated by uncovered disc 25 and the remainder by the covering transparent member 21.

The flexible transparent disc or sheet 21 has "New Day" printed at the bottom, FIG. 4, just to the right of slot 35. When this sheet is on top, as it is on the right hand part of FIG. 4, it correctly indicates the "new" day, as distinguished from the "old," which is also printed on sheet 21 at the left of slot 27, but this is not exposed in FIG. 4 because the opaque or substantially opaque cartographic disc 25 has that part of disc 21 covered.

The cartographic disc 25 has "New Day" printed at the left of slot 35, FIG. 1, i.e. clockwise from the slot as seen in FIG. 4 and has "Old Day" printed at the right (FIG. 1) or counter-clockwise from slot 27, FIG. 4. These both show at all times. In FIG. 4, "old" day is seen on the face of sheet 25 near the 2:00 p.m. position whereas "new" day printed on the same sheet 25 appears through transparent sheet 21. The disc 21 thus cooperates with sheet 25 to show the correct date and by reason of its transparency, it exposes the polar projection map over the whole "new day" area in the case of FIG. 4. The transparent disc 21 preferably is tinted slightly to show color contrast between the new day and the old.

In the case of FIG. 5, the disc 25 has been rotated still farther and into the second day in a counter-clockwise direction. It has passed the midnight line where its following edge at slot 27 has been lifted (through hole 36) above sheet 21, and "New Day" is showing adjacent slot 35, now in the 9:00 a.m. position. "Old Day," printed on sheet 25, is showing through the overlying transparent member 21, on the other side of the slot 27, the covered area of sheet 25 being somewhat shaded or of different aspect than the uncovered part, when seen through sheet 21. The "Old Day" shows also on the transparent member, where it is imprinted on sheet 21 at the left of slot 35. In this position, nine hours of the new day are shown, whereas the "old" day still prevails for 15 hours on the rest of the earth. The inscription "New Day," printed on the transparent sheet 21 at the right of slot 35, FIG. 1, is not visible in FIG. 5, being covered by the opaque member 25. FIG. 4 shows a reverse situation.

Thus, the user may merely note the correct time at his own location and rotate the cartographic member counterclockwise until his location is opposite that time. The chart there shows the correct day and time at any place on the earth.

For demonstration to students of the international date line concept, the instructor may well start off by setting the slot 27 in disc 25 at midnight position. See FIG. 1. There is the advantage of realism in using the midnight reference point, at the bottom of the chart, rather than the sun as principal reference. The new day starts at midnight and grows as is shown by rotating the disc 25 in a counter-clockwise direction. Just as the earth rotates on its own axis toward the east, the chart shows how the new day begins at midnight and grows as time passes. With the parts in the starting position, FIG. 1, the slots 35 and 27 both coincide essentially with the international date line. In this position there is only one date on the entire earth. An hour later, all points along the international date line have advanced fifteen degrees of rotation and the new day is one hour old, while 23 hours remain of the old day.

Figure 10:
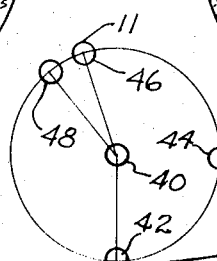
FIG. 10 is a diagrammatic view of an orbital system, shown for explanatory purposes.

By carrying the chart around a central fixed object 40, see FIG. 10, which can be taken to represent the sun of our solar system, the unidirectional rotation of the earth about its own axis, and also its orbital travel around the sun, can be clearly and realistically demonstrated. Unlike prior devices where a disc, representing the rotating earth, had to be reversed to a starting position after 24 hours, this device permits continuous rotation. By passing disc 25 above disc 21 for one rotation, then through slot 35 and under it the next rotation, alternating the raising and lowering of tab 37, with respect to tab 39, i.e. passing disc 25 up through slot 35 and then down, etc., the days can be shown continuously in unidirectional sequence. A glance shows part of the earth being represented in the "new day" and part in the "old day" at any given instant, with the single exception that when the international date line is at midnight there is only one day on the surface of the whole earth. The progress of the earth around its orbit is represented at points 42, 44, 46 and 48 in FIG. 10. If desired, the chart of FIG. 1 may be secured to a conventional sun and earth planetary demonstration device, to show the progress of time on the earth due to earth's rotation, as well as the progression of the earth around the sun.

Figure 7:
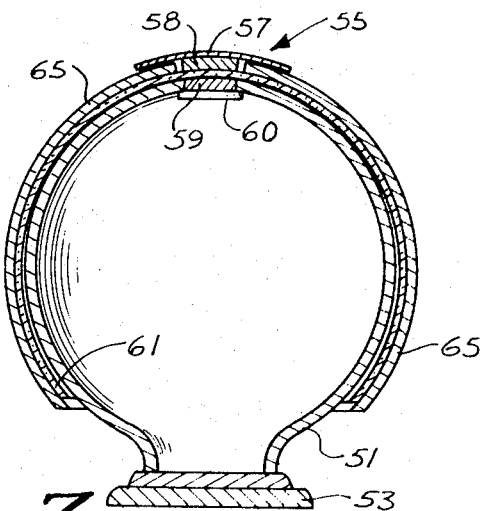
FIG. 7 is a vertical sectional view taken substantially along line 7—7 of FIG. 6.
Figure 8:
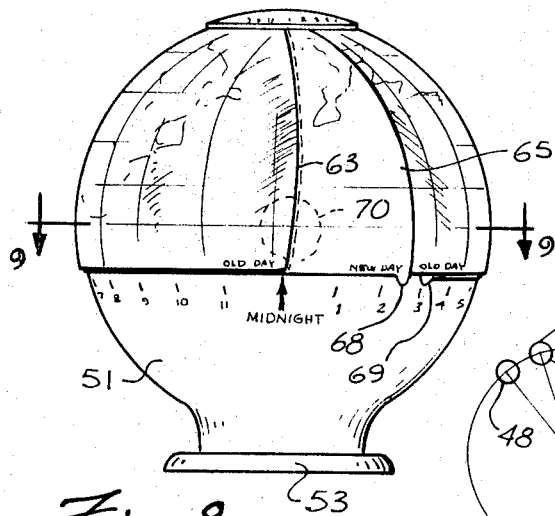
FIG. 8 is a front view of a device such as shown in FIGS. 6 and 7, with parts in changed positions.
Figure 9:
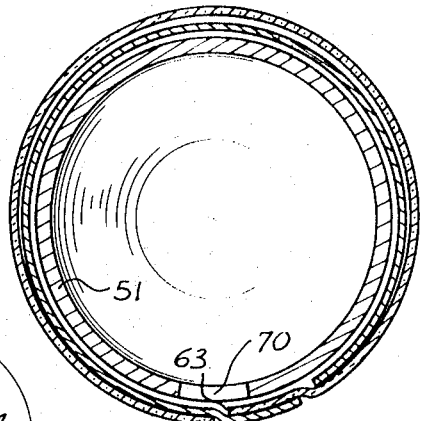
FIG. 9 is a transverse sectional view taken substantially along line 9—9 of FIG. 8.

While the substantially plane device of FIGS. 1 to 5 ordinarily is preferred, for reasons of economy, the invention is adaptable also to a globular construction, which looks more realistic still. As shown in FIGS. 6 to 9, a base 51 may be formed substantially as a globe having a support 53 of any suitable type. At the top of base 51 a hub 55, essentially like hub assembly 13, FIG. 2, is made up of a cap member 57, spacers 58 and 59, and an inner cap 60. A transparent or translucent partial sphere 61 (it may be a three-quarter sphere, more or less, if desired, as shown in FIG. 7 or somewhat less as seen in FIG. 8) is fixed to but spaced from base sphere 51 by the hub structure. It is slitted at 63, in a manner analogous to slot 35 in disc 21, as already described. A movable cartographic hemisphere 65 (or three-quarter sphere) also is slotted at 67 and mounted on the hub 55. Tabs 68, 69 or equivalent handles, are provided on spherical member 65 so that it can be rotated. Note how the two sides of slit 63 are separated as seen in FIG. 9.

The "spherical" members 61 and 65, which are not fully spherical but preferably extend for at least a hemisphere or more, or at least one of them, are sufficiently elastic and flexible, that the cartographic or data-bearing member 65 can be passed inside or outside of the transparent member 61. One member or both are flexed and deformed enough that the edge of one, at its slot, can be passed through the slot in the other, in a manner exactly analogous to that described above in connection with members 21, 25, and their slots 27, 35, etc. The above reference to "spherical" surface or shape here and in the claims is intended to be generic to hemispheres and other fractions or portions of a full spherical surface.

It is desirable to have the map bearing globe 65 show as much of the earth's surface as possible, so long as it and/or transparent globe 61 can be flexed enough to permit alternate passage of one inside and then outside of the other. The arrangement shown in FIG. 8 indicates or portrays the entire northern hemisphere and most of the inhabitable area of the southern hemisphere as well. A polar projection, or a modification of such, may be made to show nearly the whole surface of the earth on a hemispherical or somewhat more than hemispherical map globe element 65. By choosing an elastic transparent member 61, made of suitable flexible plastic material, it is possible to have the parts 61 and 65 pass alternately inside and outside each other in successive rotations, even if globe member 65 is fairly stiff. The plastic transparent member 61, like disc member 21 described above, preferably is not completely transparent or clear and colorless, but is provided with enough tincture to show a noticeable contrast between successive days. However, this is not always essential but it is a very desirable feature for visual demonstration.

A hole 70 or other suitable access is provided in base member 51, FIGS. 8 and 9, to permit the necessary manipulation of the edges of members 61, 65 along slots 63 and/or 67 so that the parts can be properly guided or interleaved when interleaving is needed.

Figure 11:
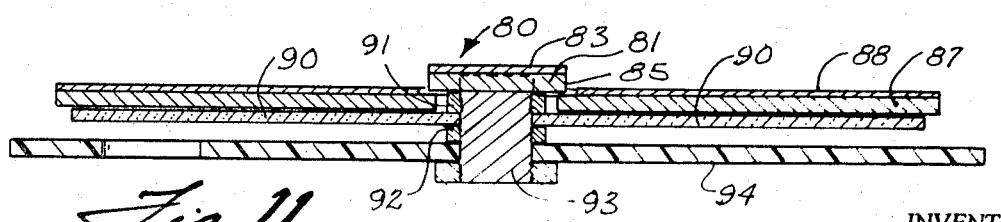
FIG. 11 is a sectional view of a modification of the disc-type device of FIGS. 1 to 5.

FIG. 11 shows a modified hub assembly analogous to those of FIGS. 2 and 7. Here the hub 80 consists of a nut member 81 which may bear a cap 83, and having a retaining flange 85 adapted to keep the cartographic or map bearing member 87 in place. The map is shown as a separate layer 88. The member 87 is rotatable about a spacer element 91 on the next member and is identical with or analogous to members 25 and 65 already described. It is also slotted so that it can be interleaved with a non-rotatable transparent or translucent flexible disc or sheet member 90, corresponding to disc 21 or to globe member 61. The latter, of course, is slotted also. It is adapted to be clamped between space elements 91 and 92.

Cooperating with nut member 81 is a threaded stud or bolt element 93 which is firmly secured to a base sheet (or globe) member 94 and includes or supports the spacer element 92 which is adapted to serve as a hub or axle for the rotatable cartographic member 87 when the latter is in the lower or inner position. The parts are assembled by screwing bolt member 93 into the nut 81, with spacers 91 and 92 clamping the flexible transparent member 90 firmly against rotation or other displacement. The cap member 15, FIGS. 1 and 2, or 57, FIGS. 7 and 8, or 83, FIG. 11, may bear a portion of the map to blend in with the movable cartographic member 25, 65 or 87. In all cases, the parts are assembled so that the translucent member does not rotate but is fixed though flexible enough to permit interleaving with the map member. The latter is rotatable both inside and outside the translucent member and can be rotated continuously in one direction, with or without interleaving with the translucent member. Interleaving with a translucent member having a contrasting appearance is particularly effective in showing the succession of a new day and the waning of the old, although some aspects or uses of the invention may not always require such interleaving. The natural and continuing unidirectional rotation is particularly suitable and realistic for teaching the subjects of times and dates as associated with world geography and our solar system.

The device has been described as designed primarily for demonstration of time and geography from the viewpoint of the northern hemisphere. It is assumed, for example, that a viewer is positioned above the North Pole. However, by reversing the arrangement and rotating clockwise rather than counter-clockwise, it can be used equally well to teach time and day sequence from the viewpoint of the South Pole, as will be obvious.

While a map, and particularly a polar projection map is highly desirable, especially for the device of FIGS. 1 to 5 and FIG. 11, and a globular map is desirable for the arrangement of FIGS. 6 to 9, the device is useful for some aspects of times and dates without bearing a detailed map. Numerous modifications and variations, in addition to those already suggested may occur to those skilled in the art. It is intended by the claims that follow to cover such as broadly and fully as the state of the prior art properly permits.

What is claimed is:

1. A device of the character described which consists essentially of:
   (a) a base member bearing a circle of time data beginning with midnight as a zero point,
   (b) a hub fixed to said base with its axis at the center of said circle,
   (c) a translucent circular member lying within said circle, fixed against rotation to a middle point of said hub and slotted from said hub to its periphery opposite said zero point of midnight, and
   (d) a continuously unidirectionally rotatable circular display member mounted with a central opening on said hub and slotted from said opening to its periphery to permit it to be passed through the fixed member for rotation on either side thereof, said display member bearing a geographic representation of an area of the earth with a pole at the hub and bearing also time meridian markings with said slot along the international date line of said geographical representation of the earth, said translucent member bearing indicia indicating a new day adjacent the east side of the slot therein and said display member bearing like indicia adjacent the west side of the slot therein,
   (e) said hub being provided with a bearing surface on each side of the fixed mmeber so that the display member can be rotated continuously in one direction to simulate the earth's rotation while being alternately passed through the slotted translucent member for alternate display above and below the translucent member.

2. Combination according to claim 1 wherein the base member, the translucent member and the data-bearing member are all substantially plane surfaced.

3. Combination according to claim 1 wherein the base member, the translucent member and the data-bearing member are all of substantailly spherical surface.

4. Combination according to claim 1 wherein the data-bearing member comprises a polar projection map, wherein the base member bears time data, and wherein the translucent member is tinted to provide color contrast when it overlies the data member.

5. Combination according to claim 1 wherein the base member is substantially spherical in form and the data-bearing member has a spherical surface of at least a substantial part of a sphere and bears a map showing at least a full hemisphere of the earth's surface.

6. Combination according to claim 5 wherein the translucent member is of spherical surface and is composed of a transparent, tinted plastic sheeting of such elasticity and flexibility as to permit passing the data-bearng member through its slot from one surface to the other of the translucent member.

7. Combination according to claim 1 wherein the hub member comprises two opposed portions, one secured to a cap and the other to said base member, the translucent sheet being securely fastened between said opposed portions.

8. A device according to claim 1 bearing time and date indicia and wherein the base member indicia show time of day, wherein both new day and old day data are exhibited on at least one of the translucent and data-bearing members at all times when two different days are represented.

References Cited

UNITED STATES PATENTS

| | | | |
|---|---|---|---|
| 680,018 | 8/1901 | Brake | 35—44 |
| 1,419,604 | 6/1922 | Beckley | 35—44 X |
| 1,836,643 | 12/1931 | Chesham | 35—74 |
| 2,011,517 | 8/1935 | Geoffrion | 35—74 UX |
| 2,513,465 | 7/1950 | Fisk | 35—46 RX |
| 2,525,895 | 10/1950 | Graves | 35—44 |

FOREIGN PATENTS

| | | |
|---|---|---|
| 523,031 | 4/1921 | France. |
| 152,279 | AD 1888 | Great Britain. |

JEROME SCHNALL, Primary Examiner

U.S. Cl. X.R.

35—46